(12) United States Patent
Mascolo

(10) Patent No.: US 6,505,878 B1
(45) Date of Patent: Jan. 14, 2003

(54) SLIDING HATCH FOR VEHICLES

(76) Inventor: Ralph P. Mascolo, P.O. Box 2736, Ewa Beach, HI (US) 96706

( * ) Notice: Subject to any disclaimer, the term of this patent is extended or adjusted under 35 U.S.C. 154(b) by 0 days.

(21) Appl. No.: 09/627,391

(22) Filed: Jul. 28, 2000

(51) Int. Cl.$^7$ .............. B60J 7/04; B60J 1/18; B60P 7/02
(52) U.S. Cl. .............. 296/100.04; 296/146.16
(58) Field of Search ............... 296/100.02, 100.03, 296/100.04, 56, 146.16, 106

(56) References Cited

U.S. PATENT DOCUMENTS

| | | | | |
|---|---|---|---|---|
| 1,681,062 A | * | 8/1928 | Sparshatt | 296/100.04 |
| 1,729,555 A | * | 9/1929 | Sparshatt | 296/100.04 |
| 2,014,140 A | * | 9/1935 | Larsen | 296/100.04 |
| 2,074,358 A | * | 3/1937 | Bixel et al. | 296/100.03 |
| 2,112,652 A | * | 3/1938 | Hawkins | 296/100.03 |
| 2,496,437 A | * | 2/1950 | Bramble | 296/105 |
| 2,992,040 A | * | 7/1961 | Groth et al. | 296/106 |
| 3,165,352 A | * | 1/1965 | Hallock et al. | 296/100.04 |
| 3,214,213 A | * | 10/1965 | Hezler, Jr. et al. | 296/146.16 |
| 3,333,889 A | * | 8/1967 | Golde | 296/106 |
| 3,675,967 A | * | 7/1972 | Ahrens | 296/100.03 |
| 3,910,629 A | * | 10/1975 | Woodard | 296/100.05 |
| 4,063,774 A | * | 12/1977 | Hanks | 296/216.04 |
| 4,272,121 A | * | 6/1981 | Kim | 296/216.04 |
| 4,620,743 A | * | 11/1986 | Eke | 296/56 |
| 4,659,136 A | * | 4/1987 | Martin et al. | 296/100.04 |
| 4,712,827 A | * | 12/1987 | Jensen | 296/106 |
| 4,784,429 A | * | 11/1988 | Hodges | 296/100.04 |
| 4,932,717 A | * | 6/1990 | Swann | 296/56 |
| 5,052,739 A | * | 10/1991 | Irwin | 296/100.04 |
| 5,203,603 A | * | 4/1993 | Hertzberg et al. | 296/100.03 |
| 6,126,225 A | * | 10/2000 | Griffin | 296/100.02 |
| 6,299,243 B1 | * | 10/2001 | Gerald, Sr. | 296/100.03 |
| 6,305,740 B1 | * | 10/2001 | Staser et al. | 296/222 |

* cited by examiner

Primary Examiner—D. Glenn Dayoan
Assistant Examiner—H. Gutman
(74) Attorney, Agent, or Firm—Cristina M Offenberg

(57) ABSTRACT

For vehicles with a rear cargo space and a cargo space enclosure, a sliding hatch is provided that is designed to fit over an opening in the roof of the enclosure above the cargo space. The opening forms a part of the same opening provided when the rear window and rear door of the enclosure are opened. The sliding hatch is mounted to enable it to slide forward and above the passenger compartment of the vehicle to provide a vertical clearance in the cargo space for objects being hauled and loaded. The sliding hatch is designed to be water tight through the design of a rain duct with a raised lip disposed around the opening. The sliding hatch is designed to receive a rear window in a pocket in the underside of the sliding hatch for convenience and ease of use.

11 Claims, 5 Drawing Sheets

SLIDING HATCH FOR VEHICLES

BACKGROUND OF THE INVENTION

1. Field of the Invention

The present invention relates generally to vehicles with enclosed cargo space and, particularly, to pickup trucks with Caps used to enclose open truck-beds.

2. Description of the Related Art including information disclosed under 37 CFR 1.97 and 1.98

One of the reasons pickup trucks, station wagons and, spots utility vehicles are so popular is that they all provide a large rear cargo space which is useful for loading and hauling various sized bulky objects and pieces of equipment in addition to providing personal transportation. These vehicles' cargo space allows them to be versatile vehicles because they can carry a variety of material loads while providing an ease of loading. In the case of a pickup truck, the ease of maneuvering loads in an open cargo area, is provided at a loss to protection, safety, privacy and shelter. Therefore, it has become popular to equip pickup trucks with an enclosed, removable cap for the open cargo space which extends rearward from the cab. However, the utility of pickup trucks for hauling purposes is restricted when a truck cap is placed on the vehicle as it limits the height of the cargo bed space and limits the ability to load from above. The same issue arises with sport utility vehicles and station wagons. Accordingly, truck caps and station wagon roofs have been designed which do provide access to the cargo bed space through the roof enclosure. However, these caps and roof openings are usually cumbersome, aerodynamically poor, have only a reduced opening space and, further, do no prevent rain water from leaking into the cargo space all of which are important drawbacks. For these reasons, the prior art opening truck caps and station wagon roofs have not been widely produced for the marketplace.

It is desirable to devise a water tight cargo space enclosure hatch that could provide protection, safety, privacy, and shelter while still providing a large opening in the cargo bed space. Accordingly, the present invention is drawn towards a sliding hatch for vehicle enclosures having a cargo space to access the cargo space from the top of the enclosure. More specifically, the present invention is primarily directed towards a pickup truck cap with a sliding hatch designed with the ability to prevent water leakage that can be moved forward and lifted above the truck passenger compartment to provide a large opening to the truck cargo bed space.

BRIEF SUMMARY OF THE INVENTION

In accordance with the present invention, for ease of description and to describe the preferred embodiment of the invention, it is described and shown as a sliding hatch on a pickup truck cap. As stated earlier, the sliding hatch can be adapted to any vehicle enclosure having a rear cargo bed space. A pickup truck cap is provided with a rectangular opening on the upper surface of the truck cap. The rectangular opening forms a continuation of the opening provided by the rear window and rear tailgate door of the pickup when it is opened to gain access to the cargo bed space. A sliding hatch with an opening for a storable rear window is provided for covering the rectangular opening. The cap is provided with two parallel hatch slide channels. These enable the sliding hatch to slide forward over the truck passenger compartment to uncover the rectangular opening in the cap roof when it is desired. This removes all vertical clearance restrictions in the cargo bed space allowing for objects to be easily loaded and hauled therein. The truck cap encompasses a rain channel with a raised lip in order to prevent rain water from leaking into the cap. The truck cap has a rear window designed to be stored away within the sliding hatch for convenient, easy access. Additionally, on trucks equipped with an extended cab or "crew cab", the sliding hatch will open even further because of the additional roof space over the passenger compartment.

Accordingly, one of the objects of the present invention is to increase the utility of the cargo space of a truck, sports utility vehicle or station wagon equipped with a truck cap.

Another object of the present invention is to provide for a large opening in the rear cargo space which would allow a larger vertical clearance for objects placed into and carried in the cargo space thereof.

Yet another object of the present invention is to provide a sliding hatch which can be moved forward and above the vehicle passenger compartment uncovering the a rectangular opening of the cargo space enclosure. Still another object of the present invention is to provide a sliding hatch that is water tight when closed.

Still another object of the present invention is to provide a sliding hatch with a storable rear window.

With these and other objects in view, the invention consists of the construction, arrangement, and combination of the various parts of the device whereby the objects contemplated are attained as hereinafter set forth, pointed out in the appended claims, and illustrated in the accompanying drawings. It is understood that the invention is not to be limited to the exact details of construction, operation, or exact materials or embodiments shown and described, as various modifications and equivalents will be apparent to one skilled in the art, and the invention is therefore to be limited only by the full scope of the appended claims.

DETAILED DESCRIPTION OF THE INVENTION

Figure 1:
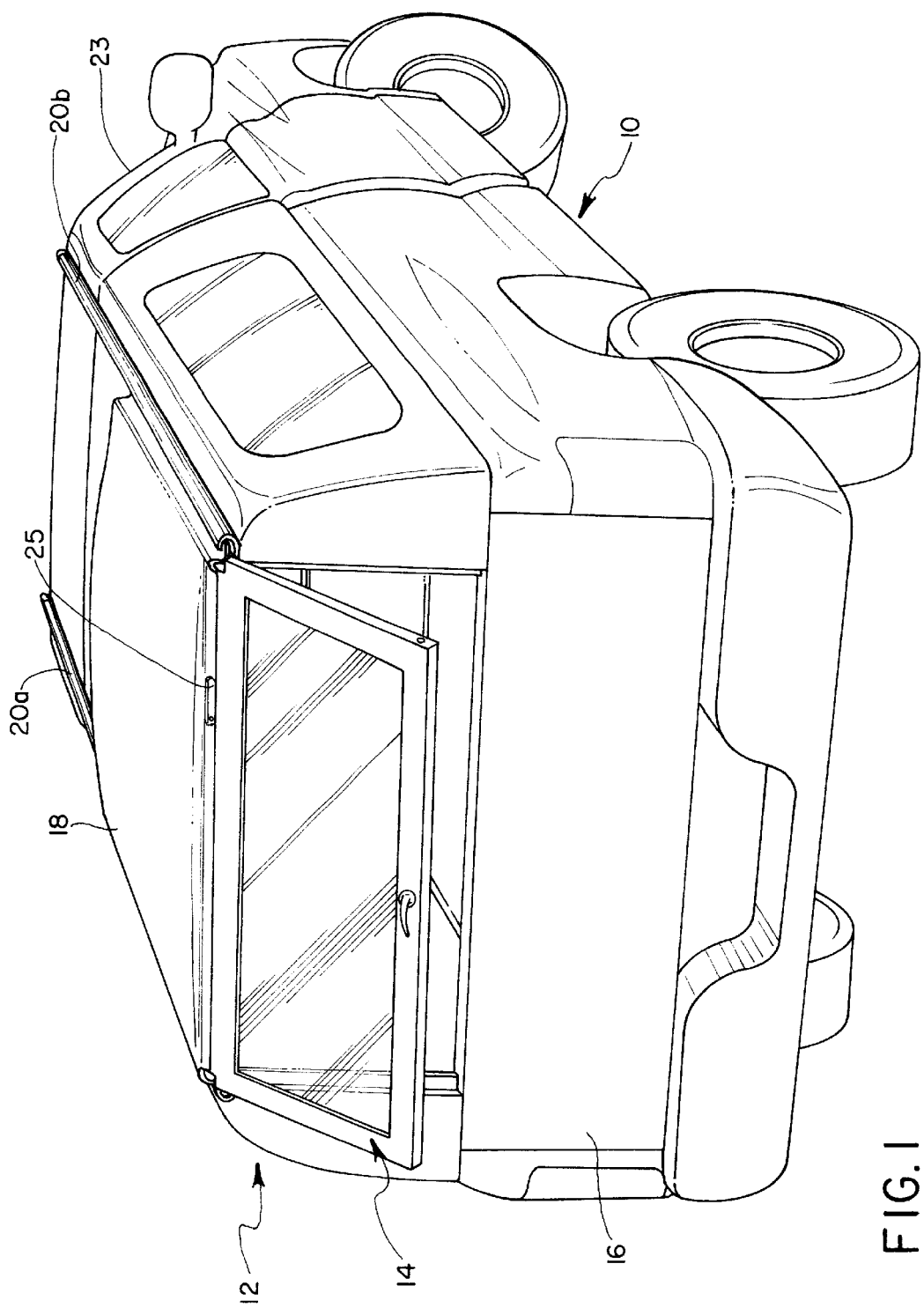
FIG. 1 is a perspective view of a pickup truck showing a truck cap mounted thereon that embodies the elements of the subject invention.
Figure 2:
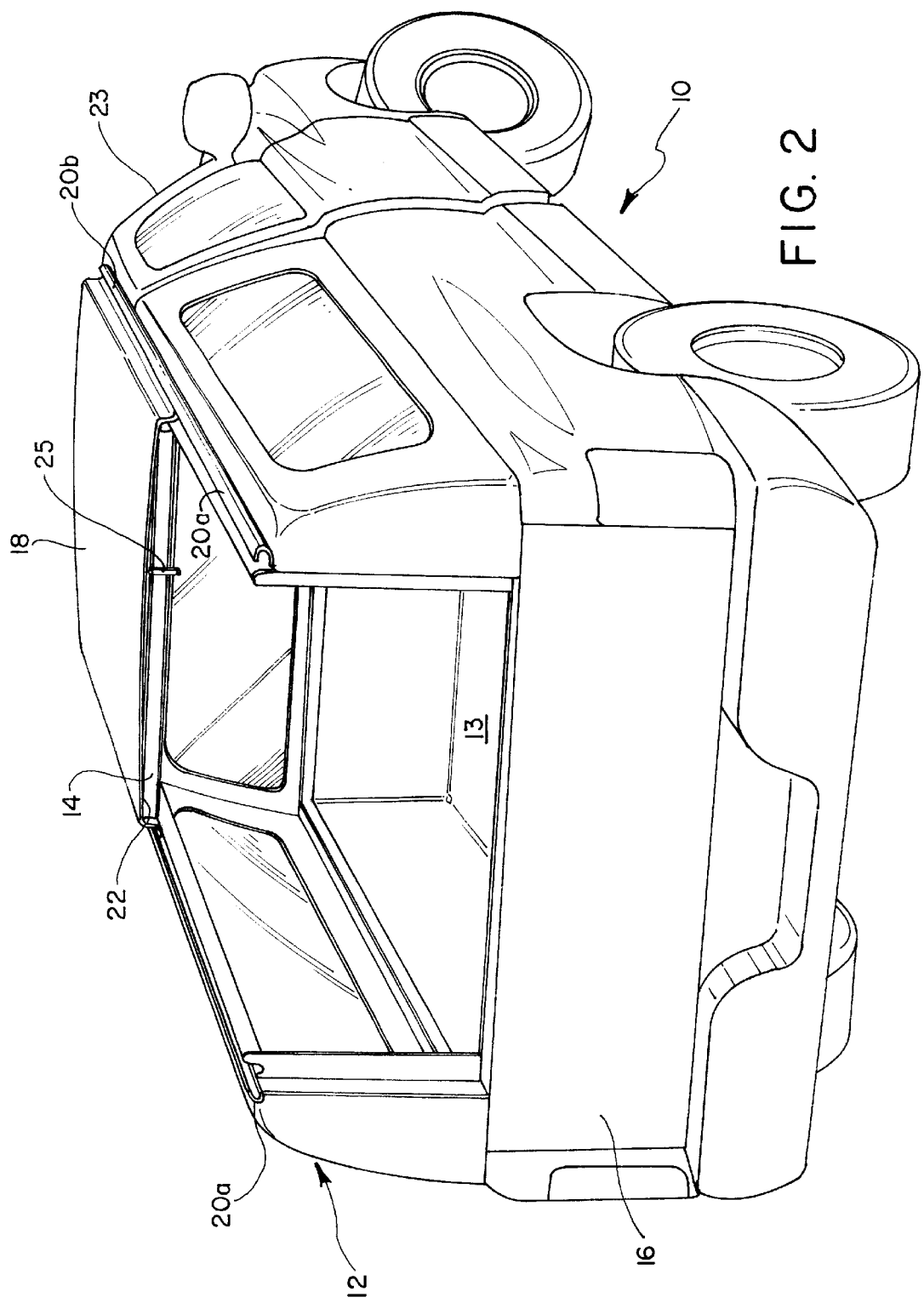
FIG. 2 is a perspective view of a pickup truck shown in FIG. 1 with the truck cap sliding hatch in the open position and the rear window stored in the sliding hatch.

Referring to FIG. 1, a pickup truck (10) with a truck cap (12) is shown with its rearwindow (14) in a half opened position. The tailgate (16) of the pickup truck (10) is shown in a closed position. The truck cap (12) is shown with a sliding hatch (18) which is in the closed position. FIG. 2 shows the pickup truck (10) of FIG. 1 with the rear window (14) stored in the sliding hatch (18) and the sliding hatch (18) in the open (forward) position providing access to the cargo area in the pickup truck bed (13) without removing the truck cap (12). The truck cap (12) and the truck bed (13) are considered an enclosure. To access the cargo space of the pickup truck(10), the rear window (14) is pivotally opened and when it is aligned with the truck cap's (12) top, it slides into a window pocket (22) in the underside of the sliding hatch (18). The rear window (14) is secured in place by means of a window lock (25). The sliding hatch (18) slides forward and above the truck cab (23) on first and second hatch channels (20a and 20b) which are parallel to each other running along the top portion of the outside edge of the truck cap (12). The first and second hatch channels (20a and 20b) are fastened onto the truck cap (12) and flexibly mounted to the truck cab (23) above the passenger compartment. In the open position, the sliding hatch (18) is pushed all the way forward past the pickup truck cap (12) and lies above the truck cab (23) to provide a large opening the size of the pickup truck bed (13). The tailgate (16) is shown in a closed position however it can be opened for easy access to the pickup truck cargo space by the conventional manner with hinges (not shown).

Figure 3:
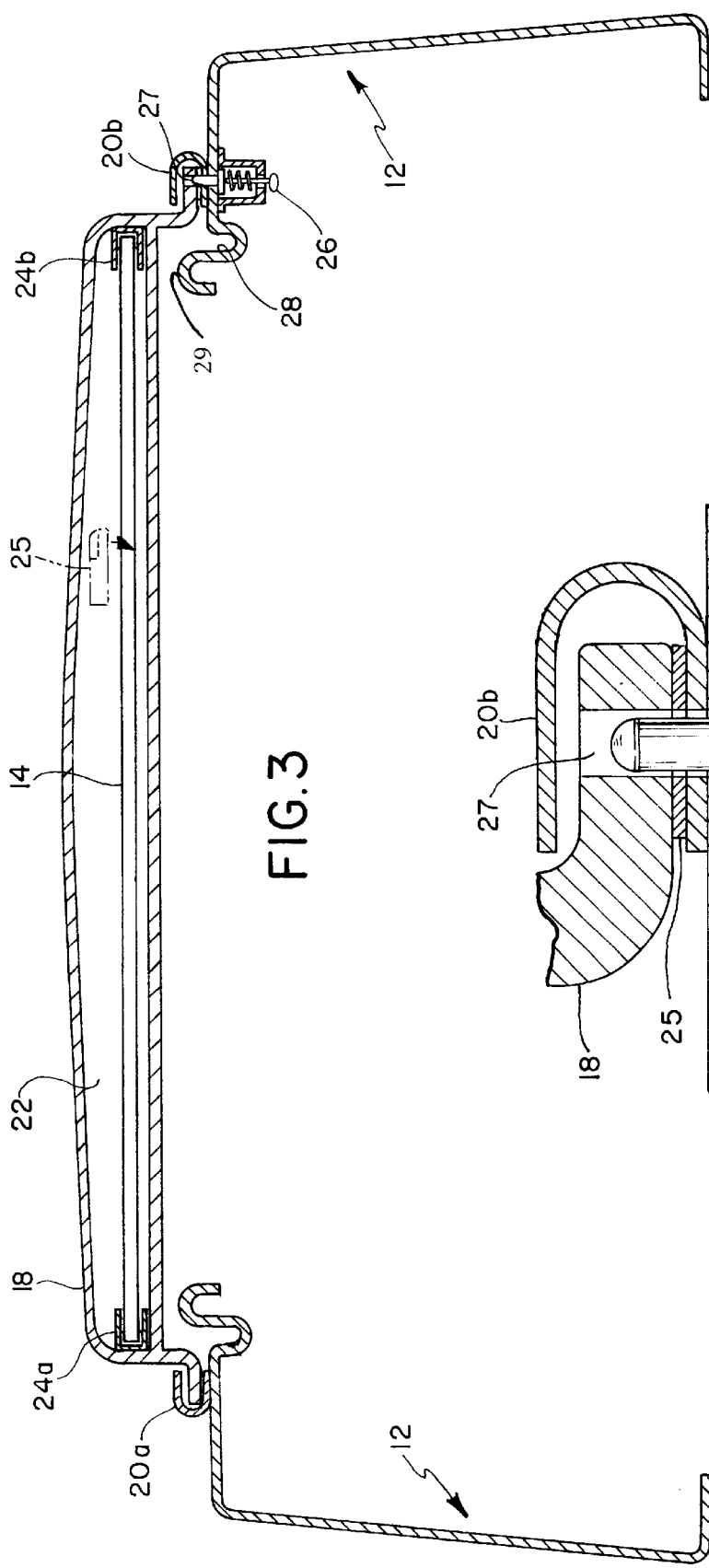
FIG. 3 is a cross sectional view of the truck cap showing the stored rear window and sliding hatch assembly

FIG. 3 illustrates the first and second hatch channels (20a and 20b) on which the sliding hatch (18) slides to be moved forward into the open position. The sliding hatch (18) is shaped to be a relatively flat hatch and sized to cover the opening and having a window pocket (22) large enough to allow the rear window (14) to fit within the window pocket (22). The rear window (14) fits within first and second window channels (24a and 24b) which are parallel to each other and are located inside the window pocket (22) along the interior side of the sliding hatch (18). .

FIG. 3 also illustrate a rain duct (28) with a raised lip (29) which prohibits rain water or other precipitation from entering the truck bed (13) when the sliding hatch (18) and rear window (14) are in their respective closed positions. As shown, the rain duct (28) is "U" shaped to allow for a channel through which the rain water is carried. The raised lip (29) which is an integral part of the truck cap (12) is higher in relation to the rain duct (28) and as shown has a reverse "U" shape from the rain duct. The raised lip (29) serves the purpose of prohibiting water from rising out of the rain duct (28) and into the truck bed (13). The raised lip (29) directs the water from the top of the truck through the rain duct (28) and down the backside of the pickup truck cap (12). The rain duct (28) runs along both sides and the front of the sliding hatch (18) opening area to make the truck bed (13) water tight. The above-outlined describes the preferred embodiment, however, the rain duct could be comprised of a flat duct rather than a "U" shaped channel running along both sides and the front of the sliding hatch (18) opening and still operate with the raised lip (29) to prohibit rain water and other precipitation from entering the truck bed (13).

Figure 4:
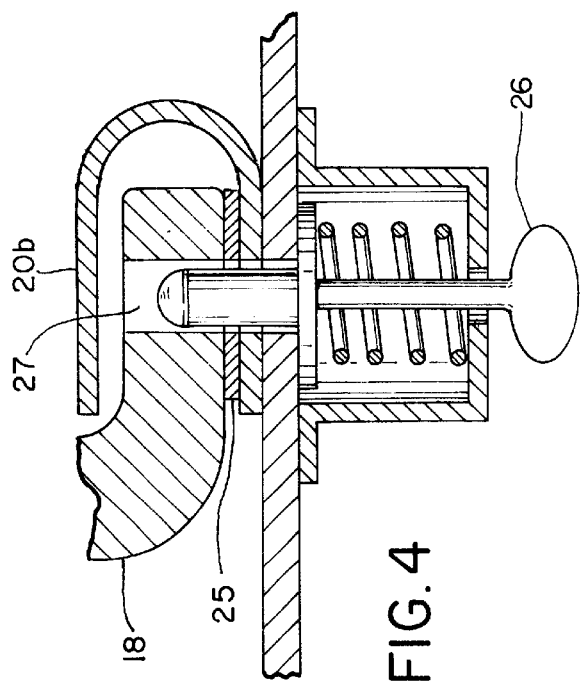
FIG. 4 is an exploded view of the spring loaded latch pin assembly.

FIG. 4 illustrates in detail the spring loaded latching pin (26) in a preferred embodiment. When the sliding hatch (18) slides forward to an open position and rearward to a closed position along the first and second hatch channels (20a and 20b), it is secured by means of a spring loaded latch pin (26) which inserts into holes (27) in the bottom side of the sliding hatch (18). To open the sliding hatch (18) and to move it forward, the spring loaded latch pin (26) must be pulled downward to release the sliding hatch (18) from a first hole in its latched position. The latch pin then holds the sliding hatch (18) in a forward, opened position when the latch pin is inserted in a second hole (not shown) in the bottom side of the sliding hatch (18). In the alternative, there could also be two latching pins, one to hold at the open position and the second to secure in the closed position. In the preferred embodiment a low friction material is applied to the edges of the bottom surface of sliding hatch (18) to aid operation of the sliding hatch (18) within the hatch channel (20a & 20b).

Figure 5:
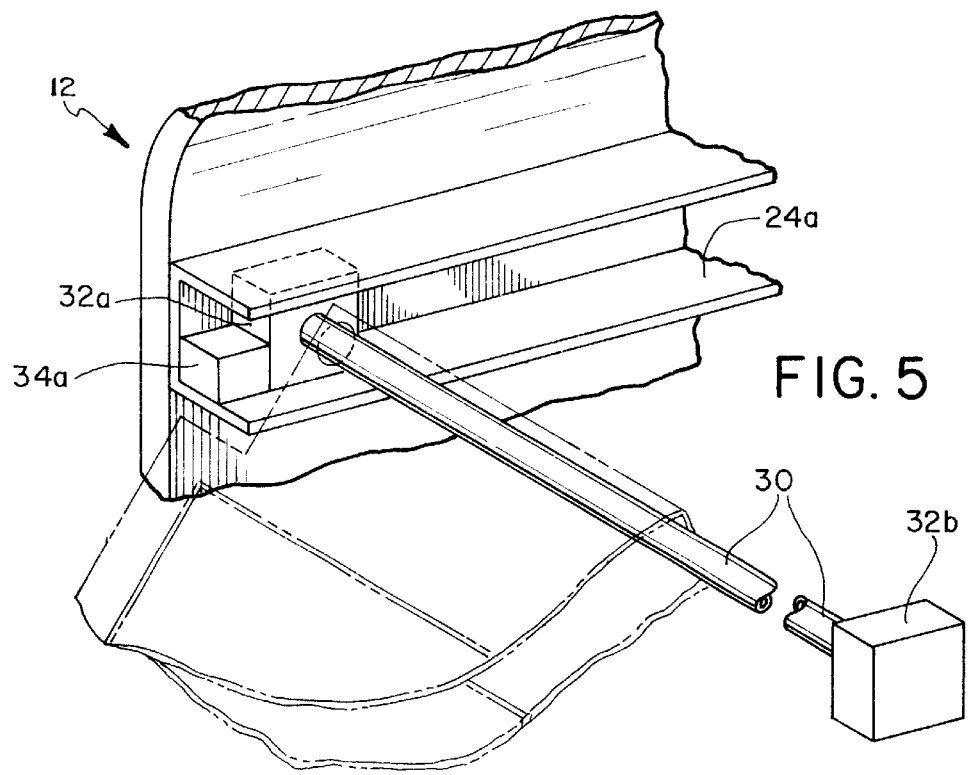
FIG. 5 is an exploded view of the rear window opening and sliding mechanism.
Figure 7:
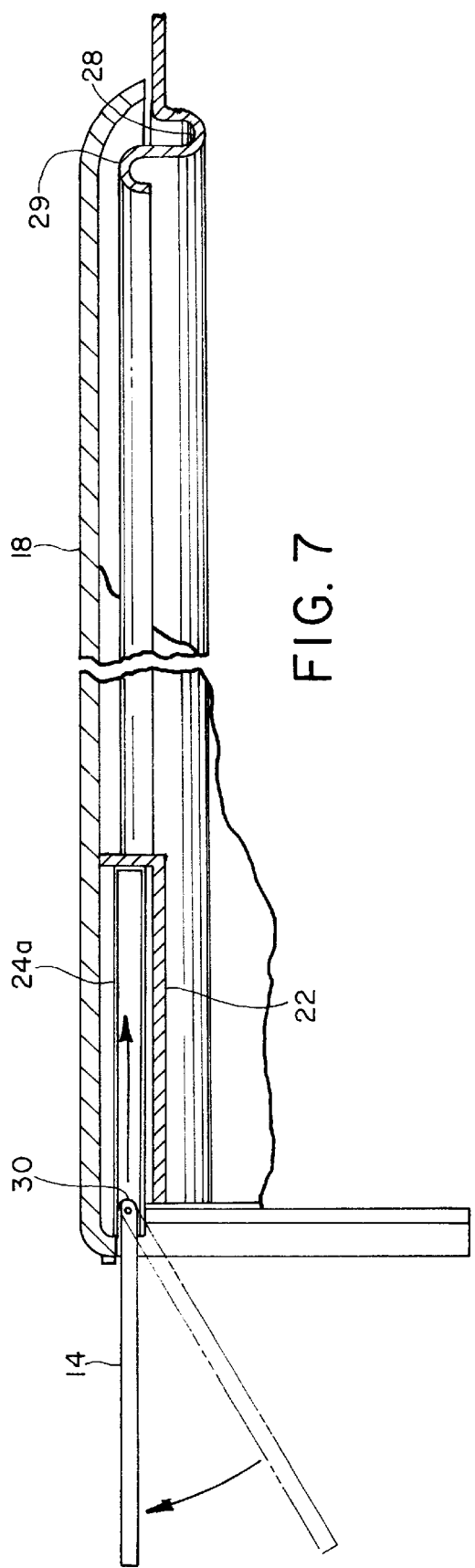
FIG. 7 is a side view of the truck cap with the window in the open position and the sliding hatch in the closed position.

FIGS. 5 and 7 illustrate the rear window (14) mechanisms. FIG. 7 shows a cross sectional side view of the rear window (14) being opened and then aligned with the sliding hatch (18) before being pushed into the window pocket (22). FIG. 5 illustrates the rear window's (14) upper edge being comprised of a cylindrical bar (30) which has first and second slide blocks (32a and 32b) on either end of the cylindrical bar (30). The cylindrical bar (30) is pivotally attached to the slide blocks (32a and 32b) to allow the window to open. The first and second slide blocks (32a and 32b) are comprised of low friction material that are contained within the window channels (24a and 24b) and slide towards the front of the truck. The rear window (14) is thus slid into the window pocket (22). A window lock (25) secures the rear window (14) in this stored position. To prevent the rear window (14) from being pulled out of the window pocket (22), first and second stop blocks (34a) are mounted on the outside edge of each of the window channels (24a and 24b) so that first and second slide blocks (32a and 32b) are prohibited from being removed from the window channels (24a and 24b) thereby preventing the rear window (14) from being pulled out of the window pocket (22). The rear window(14) is pivoted up about the cylindrical bar (30) and opened to a position in which it is aligned with the window pocket (22) and then pushed into the window pocket (22) along the first and second window channels (24a and 24b). A spring loaded window lock (25) secures the rear window (14) within the window pocket (22) and is spring loaded in the down (locked) position.

Figure 6:
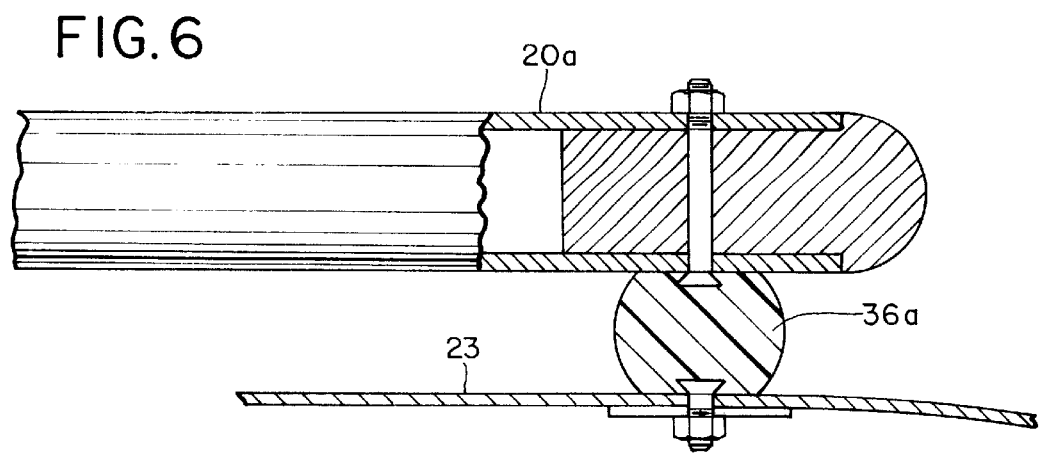
FIG. 6 is a side view of the forward flexible mounting attachment of the hatch channel to the truck cab.

FIG. 6 shows the front end of the hatch channel where it is attached to the top of the truck cab. One of two flexible mounting lugs (36a) which mount the first and second hatch channels (20a and 20b) to the top of the truck cab (23) is shown in this exploded view. The flexible mounting lugs (36a) are comprised of a resilient material to compensate for the movement between the truck bed (13) and truck cap (12) assembly and the truck cab (23) while driving. A flexible mounting lug (36a) secures the first hatch channel (20a) to the truck cab (23) as it extends past the truck cap (12). A second flexible lug is mounted parallel to secure a second hatch channel (not shown in this view).

What is claimed is:

1. A vehicle having a passenger compartment, a rear cargo space, an enclosure for the rear cargo space, and a rear door;

an opening in an upper surface and rear end of said enclosure to form a continuation of open area;

a sliding hatch sized to cover said opening in said upper surface of said enclosure;

a rear window sized to cover said opening in said rear end of said enclosure to form the enclosure when the sliding hatch, rear window and rear door are closed; and first and second channels mounted parallel to each other for receiving said sliding hatch wherein the first and second channels are disposed along an outer top edge of said upper surface of said enclosure and an upper surface of said passenger compartment; and wherein said first and second channels are securely fastened at a back end to the outer top edge of said upper surface of said enclosure and are mounted at a front end to an outer edge of said upper surface of said passenger compartment to allow the sliding hatch to slide forward to lie over said upper surface of said passenger compartment and to thereby uncover the opening and allow access to the cargo space.

2. A vehicle as stated in claim 1 further comprising said rear window which stores within a pocket in an underside of said sliding hatch.

3. A vehicle as stated in claim 1 further comprising the rear window which stores within a pocket on parallel channels in an underside of said sliding hatch wherein the rear window is pivotally attached to sliding blocks which allows the rear window to slide into said pocket inside the sliding hatch.

4. A vehicle as stated in claim 1 further comprising the rear window which stores within a pocket on parallel channels in an underside of the sliding hatch by a cylindrical bar pivotally attached to an upper edge of the rear window to which first and second slide blocks are fastened thereby allowing for the rear window to slide into the pocket inside the sliding hatch.

5. A vehicle as claimed in claim 1 further comprising a rain duct disposed on both sides and front of the upper surface of the enclosure with a lip raised higher in relation to the rain duct and the upper surface of the enclosure running parallel and adjacent to the rain duct between the rain duct and opening to prohibit precipitation from entering the enclosure when the sliding hatch and window are closed.

6. A vehicle as claimed in claim 1 further comprising a "U" shaped rain duct disposed on both sides and front of the upper surface of the enclosure with a lip raised higher in relation to the rain duct running parallel and adjacent to the rain duct between the rain duct and opening to prohibit precipitation from entering the enclosure when the sliding hatch and window are closed.

7. A vehicle as claimed in claim 1 further comprising flexible mounting legs to mount the front end of the first and second channels as the first and second channels extend past a truck cap to the upper surface of the vehicle passenger compartment to allow for flexibility during the movement of the vehicle when the vehicle is comprised of a cab and truck cap assembly.

8. A vehicle as claimed in claim 1 further comprising a window lock attached to a sliding hatch outer surface which is spring loaded to lock the rear window in a stored position within a pocket of the sliding hatch and capable of being unlocked to slide the window out of the pocket.

9. A vehicle as claimed in claim 1 further comprising;

a first latching pin attached to the upper surface of the enclosure in the rear end which is spring loaded and inserts into an aperture in a bottom side of the sliding hatch to latch the sliding hatch in a closed position and a second latching pin attached to the upper surface of the enclosure in a front end which is spring loaded and inserts into the aperture in the bottom side of the sliding hatch to latch the sliding hatch in an open position.

10. In a vehicle having a passenger compartment, a rear cargo space, an enclosure for the rear cargo space and a rear door; said enclosure having a top which extends downwardly on four sides and is secured to the rear cargo space; a rear window storable within a window pocket having a top section and bottom section and connected by side sections in an underside of said enclosure; wherein the rear window slides into the pocket on parallel channels; having a cylindrical bar pivotally attached to an upper edge of said rear window; having slide blocks attached to each end of the cylindrical bar that are sized to slide into the parallel channels of the window pocket.

11. A vehicle as stated in claim 10 further comprising a spring loaded window lock attached to an outer surface of the enclosure to keep the rear window in a stored position.

* * * * *